Figure 1:
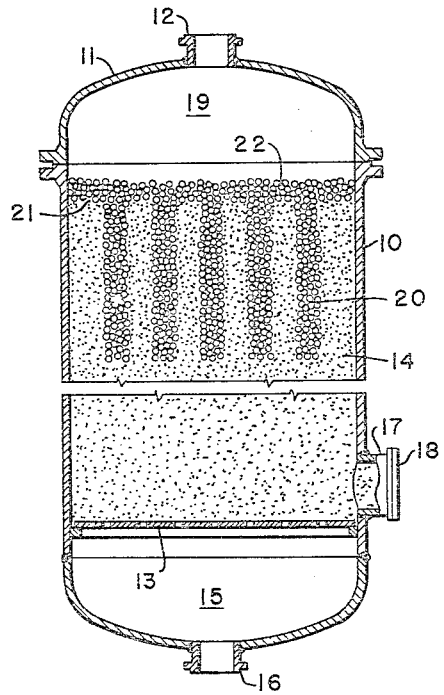

May 21, 1963 J. CONNELLAN 3,090,667
GRANULAR BED CONTACTOR WITH EXTENDED SURFACE
AND METHOD OF MAKING AND USING SAME
Filed Jan. 18, 1960

INVENTOR:
JOHN CONNELLAN
BY: *Oswald N Mitmore*
HIS ATTORNEY

United States Patent Office 3,090,667
Patented May 21, 1963

3,090,667
GRANULAR BED CONTACTOR WITH EXTENDED SURFACE AND METHOD OF MAKING AND USING SAME
John Connelian, Hooton, England, assignor to Shell Oil Company, New York, N.Y., a corporation of Delaware
Filed Jan. 18, 1960, Ser. No. 3,056
Claims priority, application Great Britain Jan. 20, 1959
10 Claims. (Cl. 23—1)

The invention relates to apparatus for effecting contact between a bed of granular contacting solids and a fluid, wherein the fluid passes through the bed and, if desired, also through screening means adjoining the bed. Such apparatus may be used, for example, as a chemical reactor in a catalytic process, such as a catalytic desulfurization process wherein hydrocarbon vapor derived from heavy naphtha containing sulfur compounds is passed through a bed containing particulate cobalt-molybdenum catalyst to convert the sulfur compounds to hydrogen sulfide.

In such apparatus it is often necessary to mount a screen within the vessel near the bed of solids, either on the upstream side thereof to prevent entrained matter from being carried into the bed and/or on the downstream side to retain the solids. It has been found in practice that such screens become fouled in time, leading to reduced fluid flow rates which become so low that the unit must be shut down for cleaning. Attempts have been made to extend the on-stream life of the screens by forming them in shapes which provide a total screen area greater than the cross sectional area of the vessel, as by giving the screen a conical shape. Screens of such shapes are costly. Moreover, it was further found that clogging occurs also at the surface of the bed despite the use of screens. For example, it is not feasible, without incurring an excessively high pressure drop, to use a sufficiently fine screen on the upstream side of the bed to remove all entrained matter, and this forms a layer of deposits at the bed surface which soon significantly interferes with the entry of the fluid into the bed; or the bed surface may become clogged by the deposition of matter from impurities carried in the fluid state with the fluid stream. It has also been sought to provide screening means in the form of a layer of ceramic balls or other discrete bodies of inert solid material, and of a size several times greater than that of the particles of the bed, but in this case also it is found that the finer particles of entrained material pass through the screening layer and are deposited in the catalyst itself, principally at the surface of the catalyst bed, leading to a high pressure drop and consequent shutdown.

It is the object of the invention to provide an improved apparatus for contacting a fluid with a bed of subdivided contacting solids wherein the on-stream time is extended, and an improved method of introducing fluid material into a granular contacting bed.

According to the present invention an apparatus for effecting contact between a fluid and granular solids comprises a tank, a bed of granular solids in a portion of said tank constituting a solids chamber, said bed having a surface with deep depressions which extend the surface area, masses of discrete bodies of inert material situated within said depressions to maintain said depressions in being, whereby said surface is maintained in an extended form, of an area substantially exceeding the cross section of said tank, and inlet and outlet means for said tank for the flow of a fluid successively through said masses and said bed of granular solids. By this means the surface area of the bed of granular solids (specifically, for example, a catalyst bed) at which the fluid enters the bed (or leaves it) is substantially extended so that any clogging which occurs at the surface is spread out over a larger area; this enables the on-stream time of the apparatus to be significantly prolonged. The masses of inert bodies further function as a screening means.

The inert bodies are preferably of an average size several times greater than that of the particles of granular contacting solid in the bed and may most conveniently be in the form of ceramic balls of uniform size. They are advantageously also emplaced across the area of the bed to form a continuous layer, so as to serve as a screening means.

The invention also includes a method of setting up an apparatus having such a layer of inert bodies, said method comprising inserting a plurality of tubes into the surface of a partly completed bed of granular solids contained in a solids chamber, filling the tubes with discrete bodies of inert material, adding further granular contacting solids round the outsides of the tubes and then withdrawing the tubes, and, before or after the withdrawal of the tubes, adding a layer of the discrete bodies to form a layer which covers the whole surface of the bed of granular solids.

The invention further includes a coarse screen which is optionally emplaced within the bed to facilitate recovery of the inert solid bodies from the contacting solids.

Figure 2:
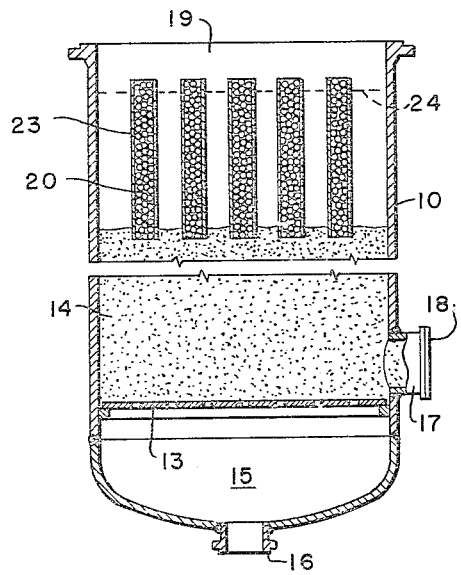
Figure 3:
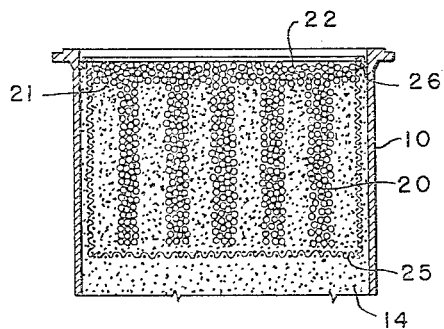

The invention will be described with reference to the accompanying drawings showing three preferred embodiments, wherein:

FIGURE 1 is a vertical sectional view through a vessel constructed in accordance with the invention, FIGURE 2 is a vertical sectional view of a part of the vessel showing a stage in setting up the bed; and FIGURE 3 is a vertical sectional view of part of the tank showing a modification.

Referring to FIGURES 1 and 2 of the drawing, the apparatus includes a tank 10 having a separate dome 11 fitted with a flanged nozzle 12 for connection to a supply pipe. A false bottom 13, including a framework and a perforated plate, supports a loose bed of granular contacting material 14. The portion of the tank occupied by this bed is herein called the solids chamber. The space 15 beneath the false bottom communicates with a discharge nozzle 16. The tank may include one or more manways, such as shown at 17, closed by a plate 18. The space 19 above the bed constitutes an antechamber.

The surface of the bed adjacent the antechamber is formed with a plurality of deep depressions which are maintained in being by masses of discrete bodies of inert material 20. These bodies may also cover the upper surface 21 of the bed entirely across the tank, to form a screening layer as indicated at 22. These bodies may, for example, be ceramic balls which are preferably larger in diameter than, e.g., having diameters two to ten times, the diameters of the granular contacting material in the bed. The masses of the bodies 20, which form downward projections from the layer 22, maintain the surface area of the bed extended in relation to the cross sectional area of the tank 10 and are the principal means for prolonging the life of the bed. The layer of bodies 22, when used, aids in maintaining the bodies 20 and the granular solids of the bed in place during operation; both bodies 20 and 22 further function as screening means to exclude coarse entrained material from the interior of the bed.

The manner of emplacing the inert bodies is illustrated in FIGURE 2. As shown, the tank 10 has its dome 11 removed and is partly filled with the bed 14 of granular contacting solids. A number of tubes 23, open at both ends, are inserted into the surface of the partly completed bed only sufficiently deep to position them vertically and are then filled with the bodies 20. The bed 14 is then completed by adding more granular contacting material about the tubes to the level indicated by the dotted line 24. The tubes are thereafter withdrawn, leaving the bodies 20 in position as shown in FIGURE 1, and the layer of additional inert bodies 22 is added before the dome 11 is replaced. If desired, the tubes may be made longer and withdrawn after the layer 22 is emplaced.

By way of example, when employed as a chemical catalytic reactor to convert sulfur compounds, such as thiophenes, to hydrogen sulfide, the bed 14 contains as the contacting solids small catalyst particles consisting essentially of cobalt and molybdenum, e.g., pellets 3/16 inch in size. Such a reactor, 5.3 feet in diameter, can be set up by the use of 28 tubes 23, each about 3 feet long and 3 inches in diameter. The bodies 20 and 22 may be ceramic balls of about one-half inch diameter, and the thickness of the layer 22 can be about 12 inches. By this arrangement, the on-stream time between cleaning was prolonged from six months (in a reactor having a screen consisting only of a 33-inch thick layer of ceramic balls without downward projections) to eighteen months.

Separation and recovery of the ceramic balls from the used catalyst bed is necessary whenever the catalyst charge is removed for periodic screening or for vessel inspection. This is facilitated by employing a coarse screen as shown in FIGURE 3. In this view reference numbers denote parts previously described, without change. The tank is provided with a screen basket 25 having a mesh just fine enough to retain the balls of the mass 20 but coarse enough to permit passage of the contacting material. This basket is supported from the tank wall by any suitable means as indicated at 26. The screen may be raised to separate the ceramic balls.

I claim as my invention:

1. Apparatus for effecting contact between a fluid and granular solids which comprises: a tank; a stationary bed of granular contacting solids situated within a portion of said tank, said portion constituting a solids chamber and an adjoining portion of said tank constituting an antechamber, said bed having a surface directed toward said antechamber and being formed with a plurality of deep columnar depressions which project from said surface into said bed and provide additional extended bed areas for the flow of fluid between the bed interior and said antechamber; a mass of discrete bodies of inert material having diameters greater than the diameters of said contacting solids situated within each of said depressions so as to maintain said depressions in being and thereby to maintain the said additional areas extended, said discrete bodies providing a multitude of flow passages which are in communication with said antechamber and with the lateral boundaries of said depressions; and inlet and outlet means for said tank, one of which communicates with said antechamber and the other with said solids chamber for the flow of said fluid successively through said chamber and the bed.

2. Apparatus according to claim 1 including, in combination, a layer of said discrete bodies in engagement with said bed over the entirety of said surface thereof, said masses of discrete bodies being continuous with said layer and forming projections thereof which extend individually into the bed.

3. Apparatus according to claim 1 wherein said discrete bodies have diameters two to ten times the diameter of said granular contacting solids.

4. Apparatus according to claim 1 wherein said discrete bodies are ceramic balls.

5. Apparatus according to claim 1 wherein said granular contacting solids are catalyst particles.

6. Apparatus according to claim 1 including, in combination, a screen embedded within said bed remotely from said surface beyond said discrete bodies, said screen having a mesh coarse enough to permit passage of the contacting solids but fine enough to retain the discrete bodies.

7. Apparatus for effecting contact between a fluid and granular solids which comprises: an upright tank; a stationary bed of granular contacting solids situated within a lower portion of said tank constituting a solids chamber, said tank having above said solids chamber a relatively smaller antechamber, said bed having at the top thereof a surface formed with a plurality of deep columnar depressions which project downwardly from said surface into the bed and provide additional extended bed areas for the flow of fluid from the antechamber into the bed; a layer of discrete bodies of inert material in engagement with said bed throughout said surface thereof and exposed to said antechamber, said layer including downward projections filling said depressions so as to maintain said depressions in being and thereby to maintain the said additional areas extended, said discrete bodies being larger in diameter than the said contacting solids and providing a multitude of flow passages which are in communication with said antechamber and with the lateral boundaries of said depressions; inlet means for said antechamber; and outlet means for discharging fluid, after passage through said antechamber, layer and bed, from the solids chamber.

8. Method of setting up apparatus for effecting contact between a fluid and granular solids, said apparatus comprising a bed of granular solids, a plurality of columnar depressions which project downwardly from the upper surface of the bed to provide additional extended surface, and discrete bodies situated within said depressions for maintaining said depressions in being, said method comprising the steps of emplacing said granular contacting solids within a tank to a fraction of the bed height; emplacing upright, open-ended tubes on the surface of the partial bed; placing into said tubes discrete bodies of inert material having diameters larger than those of said granular solids; emplacing additional granular contacting solids about said tubes; and then withdrawing said tubes.

9. Method according to claim 8 which includes the additional step of adding a layer of said discrete bodies to cover completely the surface of the additionally emplaced granular contacting solids.

10. Method of introducing a fluid into a stationary bed of granular contacting material which comprises the steps of flowing said fluid first through passages formed between discrete solid bodies of diameters larger than the granules of said contacting material, said bodies forming a layer of the surface of said stationary bed, thence through passages between additional discrete bodies also of diameters larger than said granules and arranged as substantially columnar projections which extend from said surface layer into the interior of said stationary bed in lateral contact therewith, and thence laterally from said projections into the said bed, the total entry surface of said bed adjoining said projections being greater than the cross sectional area of said bed, whereby said fluid enters the bed over an extended surface.

References Cited in the file of this patent
UNITED STATES PATENTS

| | | |
|---|---|---|
| 2,006,078 | Pyzel | June 25, 1935 |
| 2,244,612 | Crowley | June 3, 1941 |
| 2,571,262 | Latchum | Oct. 16, 1951 |
| 2,961,304 | Collins | Nov. 22, 1960 |